United States Patent
Lee et al.

[11] Patent Number: 6,134,421
[45] Date of Patent: Oct. 17, 2000

[54] RF COUPLER FOR WIRELESS TELEPHONE CRADLE

[75] Inventors: Chung-Yi Lee, San Diego, Calif.; Theodore R. Santos, Boulder, Colo.

[73] Assignee: Qualcomm Incorporated, San Diego, Calif.

[21] Appl. No.: 08/926,723

[22] Filed: Sep. 10, 1997

[51] Int. Cl.[7] .............................. H04B 1/38; H04B 1/06; H01Q 1/24

[52] U.S. Cl. .......................... 455/90; 455/345; 455/346; 343/702

[58] Field of Search .............................. 455/90, 345, 346, 455/569, 575; 343/702, 713, 715, 892, 841, 906; 379/428, 429

[56] References Cited

U.S. PATENT DOCUMENTS

| | | | |
|---|---|---|---|
| 4,661,992 | 4/1987 | Garay et al. | 455/575 |
| 5,220,335 | 6/1993 | Huang | 343/700 MS |
| 5,386,214 | 1/1995 | Sugawara | 343/700 MS |
| 5,440,315 | 8/1995 | Wright et al. | 343/702 |
| 5,517,683 | 5/1996 | Collett et al. | 455/575 |
| 5,557,287 | 9/1996 | Pottala et al. | 343/702 |
| 5,668,561 | 9/1997 | Perrotta et al. | 343/702 |
| 5,694,135 | 12/1997 | Dikun et al. | 343/700 MS |
| 5,703,600 | 12/1997 | Burrell et al. | 343/700 MS |
| 5,777,585 | 7/1998 | Tsuda et al. | 343/702 |
| 5,812,094 | 9/1998 | Maldonado | 343/702 |
| 5,852,421 | 12/1998 | Maldonado | 343/702 |
| 5,880,697 | 3/1999 | McCarrick et al. | 343/702 |
| 5,886,668 | 3/1999 | Pedersen et al. | 343/702 |
| 5,952,975 | 9/1999 | Pedersen et al. | 343/702 |
| 5,959,583 | 9/1999 | Funk | 343/702 |
| 5,963,180 | 10/1999 | Leisten | 343/895 |
| 5,970,393 | 10/1999 | Khorrami et al. | 455/66 |
| 5,986,608 | 11/1999 | Korisch et al. | 343/702 |

FOREIGN PATENT DOCUMENTS

| | | | |
|---|---|---|---|
| 0339822 | 4/1989 | European Pat. Off. | H01Q 1/52 |
| 0807988 | 11/1997 | European Pat. Off. | H01Q 1/24 |

*Primary Examiner*—Nguyen Vo
*Assistant Examiner*—Charles N. Appiah
*Attorney, Agent, or Firm*—Philip R. Wadsworth; Raymond B. Hom; Gregory Ogord

[57] ABSTRACT

A cradle can be mounted in a vehicle, or other suitable location, for supporting a wireless dual-frequency telephone that includes an antenna. The cradle includes a plastic housing and a ground plane disposed in the housing. A trough-shaped feed coupler element is electrically connected to matching circuits and an input/output connector. A first parasitic coupler element is aligned with the feed coupler element, and connected to the ground plane, and electromagnetically couples signals having a first frequency to and from the antenna. Together, the elements hold the antenna of the telephone. Also, a second parasitic element is disposed adjacent the feed coupler element for electromagnetically coupling signals to and from the antenna, that have a second frequency. If desired, the ground plane is established by a first conductive board and a second conductive board elevated above the first board.

20 Claims, 4 Drawing Sheets

RF COUPLER FOR WIRELESS TELEPHONE CRADLE

BACKGROUND OF THE INVENTION

I. Field of the Invention

The present invention relates generally to wireless telephone systems, and more particularly to radio frequency signal couplers for wireless telephones. The invention further relates to a technique for coupling multiple or different frequencies to wireless device antennas, when such devices are used with receptacles or cradles in vehicles.

II. Description of the Related Art

Wireless telephones are in widespread use because of the convenience they afford in personal communications. Wireless telephone technology continues to advance, producing better wireless communication systems while older systems nevertheless remain in use.

For example, earlier wireless telephone systems use analog communication principles and a communication frequency band of around 800 MHz (the so-called "cellular" frequency band), whereas more recent systems have been introduced that use digital communication principles in a frequency band around 1900 MHz (the so-called "personal communication system", or PCS, frequency band). In some geographic regions, both of these systems are in use, and in some circumstances the older systems that operate around 800 MHz have been or will be converted to use digital communication principles.

In any event, because of the different frequencies used by different wireless telephone systems, the frequency at which a user's wireless telephone must operate might change from region to region, system to system, or service provider to service provider. Indeed, some users in a given region might require telephones that operate at a first frequency while other users in the same region must communicate using a second frequency. In some instances, more than two frequencies might be in operation in a single area.

Recognizing the above-mentioned problem, it is recognized that it is desirable to provide wireless telephones that can communicate using one of at least two frequencies (and perhaps more), so that the telephones can be used in conjunction with more than one system. In other words, the present invention recognizes that it is desirable that one wireless telephone model be useful in more than one communication system, to increase the operational flexibility of the telephone. As a less desirable alternative, two telephones, each operating at a single respective frequency, can be provided.

At the same time, in order to increase or maintain appropriate concentration by a wireless device user on other tasks, device cradles have been developed for so-called "hands-free" communication. That is, wireless telephone cradles have be developed for use in vehicles, and other applications, which allow telephone use without unnecessary and unsafe operator distraction caused by holding the telephone. These cradles use an electromagnetic coupler to transfer signals between a telephone antenna and the cradle.

Among other considerations, the above factors, as inventively recognized herein, imply that a wireless telephone cradle or receptacle in a vehicle be capable of effectively extracting signals in at least two frequency bands from the antenna of a dual frequency wireless telephone, when the telephone is disposed in the cradle to facilitate hands-free operation. Stated differently, the telephone cradles with which many vehicles are equipped should be able to effectively couple signals from dual frequency telephone antennae to portions of the cradles that are associated with transmission and reception communication circuitry, regardless of which one of two communication frequencies the telephones might be using, to enhance communication flexibility and in some cases quality. The coupling should occur with relatively low loss.

Accordingly, it is a purpose of the present invention to provide a telephone cradle for a vehicle that effectively extracts signals in more than one frequency band from a telephone antenna. Another purpose of the present invention is to provide a telephone cradle for a vehicle that effectively transfers signals in more than one frequency band to and from a telephone antenna, and that is easy to use and cost-effective to manufacture and implement.

SUMMARY OF THE INVENTION

This invention is directed to a passive radio frequency (RF) component or electromagnetic coupler for a vehicle wireless device or telephone cradle, support structure, or receptacle, that efficiently extracts power out of, or transfers power to, a wireless device antenna when either one of at least two frequencies are used by the telephone. Stated differently, the present invention is directed to an RF coupler for a vehicle telephone cradle that is efficiently coupled to an antenna of a dual frequency wireless telephone which rests in the cradle, to improve "hands free" communication using the telephone when using either one of the frequencies.

The present wireless device cradle is mountable in a vehicle or other location for supporting a wireless telephone having an antenna. The cradle is generally manufactured with an electrically non-conductive housing, although some portions may use conductive materials for strength or shielding, and a ground plane is disposed within the housing. An active feed coupler member or element is mounted on the housing in a position adjacent to where the wireless device antenna rests when the device is supported by the cradle. The active feed coupler is connected to a matching circuit and signal conductor for transferring signals to and from the feed coupler. A parasitic coupler member or element is juxtaposed with the active feed coupler, also adjacent to where the antenna is positioned, and is electrically connected to the ground plane in the cradle. The two juxtaposed couplers electromagnetically couple signals to and from the wireless device, telephone, antenna. Together, the members establish an antenna channel for physically receiving the antenna therein. A second parasitic element is disposed adjacent to the feed coupler and the antenna channel for electromagnetically coupling signals to and from the antenna, preferably at different frequencies from the first parasitic coupler.

In a preferred embodiment, the wireless device or telephone can communicate or transfer signals using first and second frequencies. In this embodiment, the active feed and first parasitic coupler elements are each configured as trough-like half-cylinder or U-shaped elements and placed adjacent to each other, and are spaced apart along a common central axis with a small gap separating them. Their respective longitudinal dimensions are much larger than the width of the gap. This forms a physical "channel" or cylindrical depression in which the wireless device antenna or antenna stub rests. Alternatively, the coupler elements can also be V, L, squared C shaped, or even flat, as desired to fit within a specific cradle housing design.

A coupler cover or extension of the cradle housing covers the coupler elements and provides physical support for the coupler and antenna. The coupler elements can be embedded in a block of material to provide this function, and that block can be movable up and down relative to the cradle housing.

As stated, the first parasitic element operates to electromagnetically couple signals having the first frequency while the second parasitic element is configured for being electromagnetically coupled to signals having the second frequency. Preferably, the second parasitic element is formed or shaped as an elongated conductive strip having a length on the order of one-half the frequency of interest, and a width much less than half that frequency. The second parasitic element is generally oriented longitudinally adjacent to the cylindrical channel for receiving the antenna, and parallel to a central axis for the antenna. The second parasitic element, is manufactured from a metallic or conductive material, and is generally embedded in a surface of the housing adjacent to the antenna channel or active feed coupler. In some embodiments additional parasitic elements may be provided for coupling to additional frequencies.

As disclosed in detail below, in one preferred embodiment the ground plane for the cradle is established using a first major conductive board that extends over most of the cradle interior adjacent to the RF coupling portion. This ground plane may be formed on one surface of a support substrate used for other circuits or active elements, conductors, and connectors. A second smaller conductive board is elevated above the first conductive board, and is generally oriented substantially parallel to the first board. A variety of posts, stand-offs, or springs can be used to space the two conductive boards apart. The active feed and first parasitic coupler elements are mounted on the second conductive board, with the active element being connected to an input/output cable, typically through a matching circuit, and the parasitic element being connected to ground. The ground areas for the two boards are electrically connected to each other to form a common ground potential.

In still another aspect of the invention, the invention provides a method for coupling signals between a mobile telephone antenna and a telephone cradle in a vehicle when the telephone is disposed in the cradle to facilitate hands free communication. The method includes the steps of providing a signal coupler or channel for holding or partially encompassing an antenna on the telephone. The signal coupler is formed by juxtaposing an active feed coupler element with a corresponding parasitic coupler element. The active element is electrically connected to a feed circuit or conductor, and the parasitic coupler element is electrically connected to a ground plane. These coupler elements are configured so that in use they are electromagnetically coupled to signals having a first frequency. The method further includes the step of juxtaposing a second parasitic element near the active feed coupler element and where the antenna resides. This element is configured so that in use it and the active feed coupler element are electromagnetically coupled to signals having a second frequency.

In further embodiments, active feed and one or more parasitic elements may be used that are spaced farther from antenna radiators than desired for low loss signal transfer, due to either their shape or mounting structure. For example, flat coupler feed and parasitic elements supported on stand-off posts may not be capable of being positioned as immediately adjacent an antenna as desired. In this configuration, an additional parasitic element can be mounted between such coupler elements and where the antenna rests. This latter parasitic element acts as an intermediary coupling element to couple signals between the antenna and other RF coupler elements.

BRIEF DESCRIPTION OF THE DRAWINGS

The features, objects, and advantages of the present invention will become more apparent from the detailed description set forth below when taken in conjunction with the accompanying drawings in which like reference characters identify like elements throughout and wherein.

DETAILED DESCRIPTION OF THE PREFERRED EMBODIMENTS

The RF coupler of the present invention is described for use in a wireless device or telephone cradle that is mountable in a vehicle for supporting the telephone having an associated antenna. It allows "hands free" communication or operation of a multi-frequency wireless telephone which rests in the cradle at any one of the frequencies. However, those skilled in the art will appreciate that the present invention is not limited to use in vehicles, but is readily applicable to many situations where multiple frequency operation is desired for a "hands free" support for a wireless device, regardless of the structure on which it is mounted.

Figure 1A:
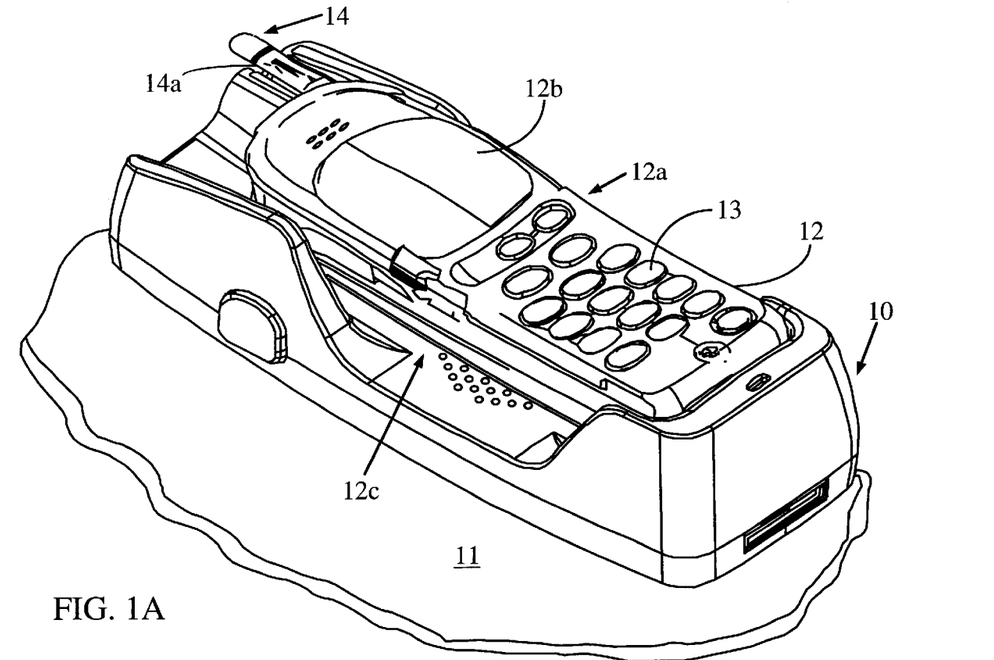
FIG. 1a is a perspective view of a telephone cradle of the present invention with a mobile telephone mounted in place.
Figure 1B:
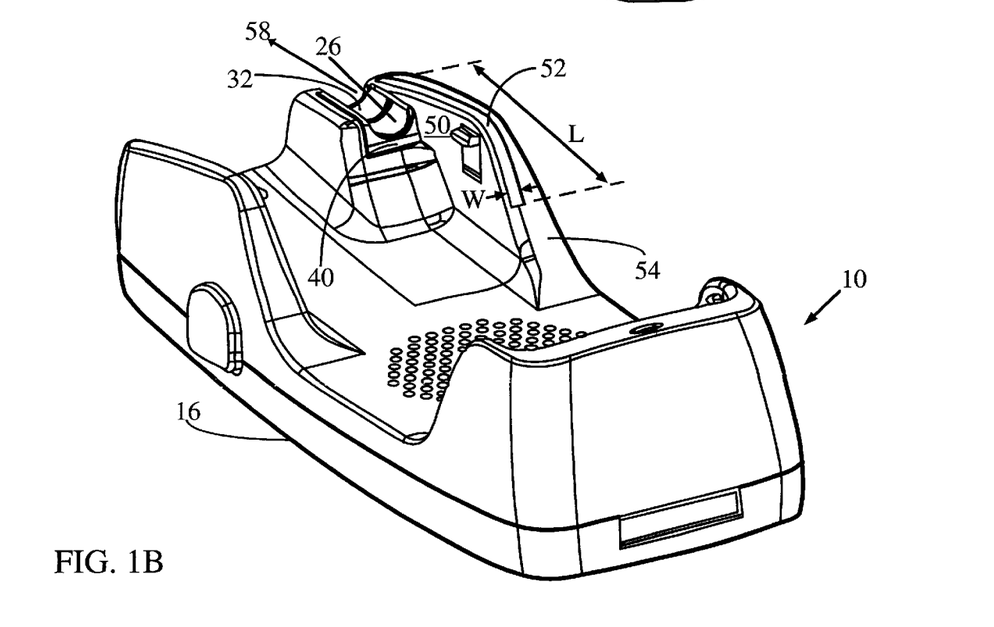
FIG. 1b is a perspective view of the telephone cradle of FIG. 1a with the mobile telephone removed.

Referring initially to FIGS. 1a and 1b, a cradle or receptacle, generally designated 10, is shown mounted inside a vehicle on a vehicle component or interior surface 11 for supporting a wireless telephone 12 that includes an antenna 14. In FIG. 1a, telephone 12 is positioned in the cradle for use, and in FIG. 1b, telephone 12 has been removed from cradle 10. The manufacture, mounting, and use of such telephone or wireless device cradles is well known to those skilled in the art, and not discussed in further detail here. As stated above, cradle 10 could also be mounted on other surfaces where a hands free operation of telephone 12 or similar wireless device is desired. The present invention is not limited to a particular application or location of the cradle. In addition, the overall design of the cradle will vary according to well known factors including aesthetic appearance, and the style of devices to be accommodated.

For purposes of the present invention, antenna 14 includes an antenna stub 14a on telephone 12. Such an antenna stub is typically present where a longer whip type antenna is collapsed to a stowed position within telephone 12. In this situation, a helical element within stub 14a, which either surrounds the base of the whip antenna or forms a part of the top end of the antenna when extended is used as an antenna for the telephone. In the alternative, some phones may employ small "stub like" antennas which are mounted on telephone 12 such as by a screw type or plug in connector.

The manufacture and use of wireless telephones having this type of antenna and antenna stub structure is well known in the art. In the articular embodiment shown, antenna stub 14a is positioned near a front surface 12a of telephone 12, with front surface 12a being "front" by virtue of including, e.g., a keypad 13 and an alpha-numeric display 12b, as is known in the art. However, the specific location of the antenna and antenna stub is not a limitation on the invention, but represents a factor to be considered in designing cradle 10. That is, where telephones being used with the cradle have antennas on one side or the other, or are located closer to the front, back, or center of the housing, the antenna coupler discussed below is repositioned accordingly, as would be known. Different styles of telephones and batteries used with them, will have a similar impact on design, as is well known.

In the preferred embodiment, cradle 10 includes a housing 16 that is made of an electrically non-conductive, lightweight, rigid material such as plastic. Such a housing can be made using well known molding techniques. However, some portions of housing 16 can be manufactured with conductive materials, such as certain lightweight or thin metals for strength or shielding, or differing types of plastic. A plastic housing might also employ an interior conductive coating in some locations for EMI shielding as desired. It is to be understood that housing 16 is generally configured for receiving telephone 12 with a rear surface 12c of telephone 12 oriented downwardly (i.e., positioned against) housing 16, leaving a front surface 12a facing up towards a potential telephone user. As the skilled artisan will recognize, rear surface 12c is opposed to front surface 12a.

Figure 2:
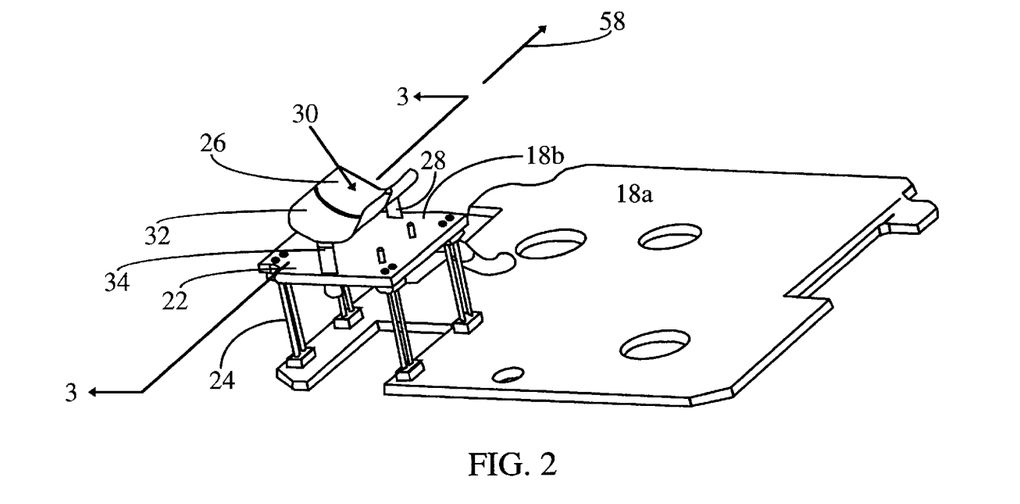
FIG. 2 is a perspective view of the RF coupler for the telephone cradle of FIG. 1 with a ground plane.

In FIG. 2 housing 16 is shown enclosing a flat printed wiring board (PWB) or substrate 18 that, among other things, establishes a ground plane. PWB 18 generally includes circuitry known in the art for transferring or coupling signals to and from telephone 12, including appropriate impedance matching circuitry for matching the impedance of the RF feed coupler described below with the impedance of an appropriate input/output signal transfer line or cable. Such cables are generally manufactured to have a 50 Ohm impedance, and operate to connect active feed elements of an RF coupler to other circuits or elements.

In the alternative, a separate ground plane formed from a layer of metallic material such as brass, aluminum, copper or similar metals can be used. A metal frame or coated substrate, or made using other conductive material may also be employed adjacent to PWB 18 for this function.

As recognized by the present invention, it is desirable that the ground plane be established close to antenna 14 of telephone 12 when telephone 12 rests in cradle 10, to improve communication quality when using telephone 12 in the "hands free" mode. However, as shown in FIG. 1, antenna 14 in the preferred embodiment is positioned on telephone 12 near the front surface 12a of telephone 12, and front surface 12a is oriented away from housing 16 when telephone 12 rests in cradle 10 in the intended operating position.

Figure 3:
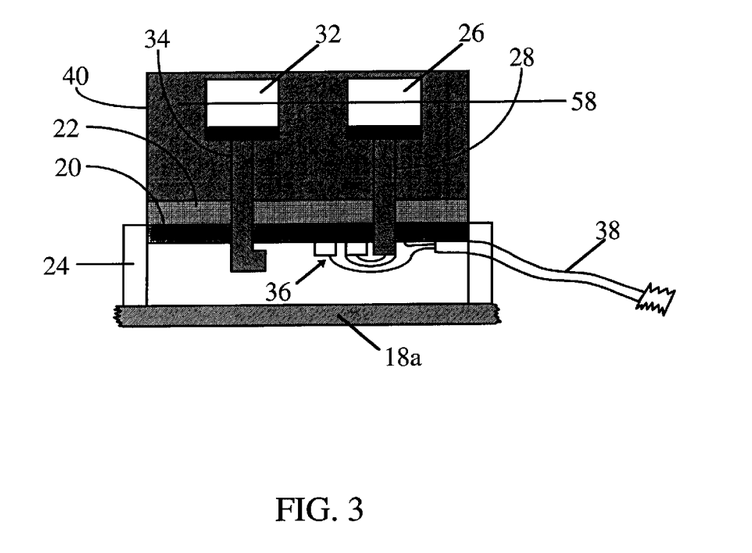
FIG. 3 is a cross-sectional view as seen along the line 3—3 in FIG. 2.

Accordingly, with this in mind, FIG. 2 shows that PWB 18 can be divided into a lower portion 18a residing in housing 16, and an upper portion 18b that is raised above, and that is generally parallel to, lower portion 18a. This places upper portion 18b in closer proximity to an upper or front surface of housing 16 and back surface 12c of telephone 12. In FIGS. 2 and 3, upper portion 18b of PWB 18 includes a board or substrate 20 that has an electrically conductive layer 22 formed on at least a portion of one side, to make upper portion 18b at least partially conductive. The conductive layer is formed from known metallic or conductive materials, as is typical in the art. A similar or identical material layer is used on a substrate forming lower PWB 18a to provide the larger ground plane.

As shown in FIGS. 2 and 3, upper portion 18b is held above lower portion 18a using a series of supports 24. Supports 24 are shown as being generally rigid supports, stand-offs, or posts. They can be positioned near the corners or in other supportive locations of upper portion 18b to rigidly support substrate 20 over lower portion 18a. Supports 24 can be manufactured from metallic materials or metal coated materials in order to connect the ground plane of upper portion 18b to lower portion 18a. In this situation, supports 24 may extend through passages in substrate 20 to contact material 22, and solder or other materials can be used to provide an electrical connection. Other known materials or techniques can be used to bond substrate 20 to supports 22. If supports 22 are made from non-conductive materials, one or more wires, ribbons, or cables can be used to interconnect the upper and lower boards and their respective ground layers. Similar connection techniques can be used when using independent ground layers.

Figure 4:
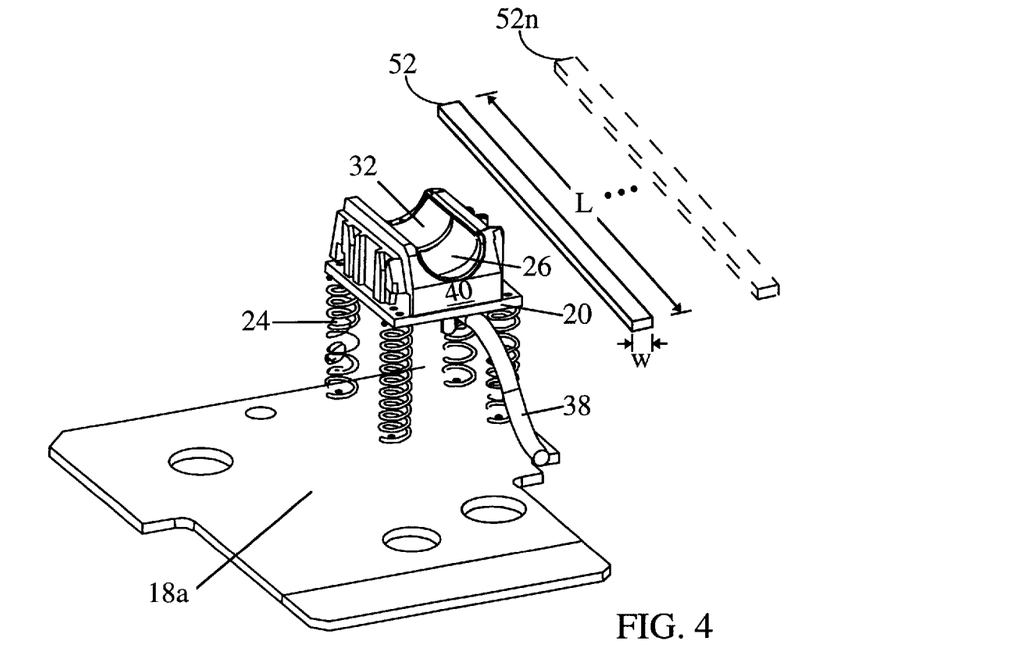
FIG. 4 is a perspective view of an alternate embodiment of the RF coupler of the present invention, showing spring supports.

Alternatively, referring briefly to FIG. 4, upper portion 18b of PWB 18 is connected to lower portion 18a of the PWB by four metal coil springs 25, typically mounted near the corners of the upper board. With this structure, upper portion 18a is biased or urged upwardly toward an antenna of a wireless telephone (not shown) to maintain a closer proximity between the two, and promote coupling of the RF coupler with the wireless telephone antenna. That is, the upper portion 18b can float on the springs and press against or near to antenna 14a during operation. The closer proximity also reduces electric filed mismatching that may otherwise occur between the antenna and coupler.

In either case, referring back to FIGS. 2 and 3, whether rigid posts 24 or springs 25 are employed, they mechanically or electrically connect together upper and lower portions 18a and 18b of PWB 18, such that these portions together establish an RF coupler ground plane. With this structure, the ground plane is in effect moved closer to antenna 14a, than it would be if only lower portion 18a is used, when telephone 12 rests in cradle 10 in the intended orientation (i.e., front surface 12a up).

An active feed coupler element 26 is mounted on upper PWB portion 18a using known means such as at least one post or stanchion 28. Active feed coupler 26 is made from conductive materials such as a shaped layer of metal, preferably copper or brass. Stanchion 28 is also made from a metallic material. Feed coupler element 26 and stanchion 28 can be formed as a unified piece of material that is stamped, cast, or otherwise shaped as desired. However, as before, a metal coated plastic could also be used to make either of these components. As shown in FIGS. 2 and 3, feed coupler element 26 is shown having or forming a channel or trough 30 that is shaped generally like a half-cylinder or half-ring. However, those skilled in the art will readily understand that while this shape is more efficient at matching the shape of the antenna, other geometric shapes can be used for element 26. Alternatively, the coupler elements can also be V, L, squared C channel shaped, or even flat, as desired to fit within a specific cradle housing design.

Feed element stanchion 28 is attached to or forms part of coupler element 26 and extends to substrate 20 of upper PWB 18b, where it is secured in place using well known means. As before for supports 22, stanchion 28 may extend through a passage in substrate 20 to allow connection to matching circuits, and to provide a means of physical attachment to the substrate for supporting the active feed element. A variety of known techniques for securing stanchion 28 in place can be used.

RF signals are transferred along stanchion 28 to a matching circuit or circuits 36 generally mounted on the underside of substrate 20. Here, signals are coupled to a desired input/output (I/O) cable or conductor 38. The manufacture and operation of such matching circuits and I/O cables are well known in the art. Electrical connection between stanchion 28 and circuits 36 can be established in a variety of known ways including a conductor formed on substrate 20 to which a lower portion of stanchion 28 is physically abutted or bonded such as by soldering.

Additionally, cradle 10 includes a parasitic coupler element 32 that is generally configured the same as feed coupler element 26, except that parasitic coupler element 32 includes a stanchion 34 that is embedded or physically secured in substrate 20 and is electrically connected to the ground plane but not to matching circuits 36. As can be appreciated in reference to FIGS. 1–3, coupler elements 26 and 30 are closely juxtaposed, such that parasitic element 30 is electromagnetically coupled to feed element 26 at a first frequency of interest for telephone 12. The gap between elements 26 and 30 is substantially less than the width of the elements themselves, typically a small fraction of the wavelength of interest.

An insulating material in the form of a small housing, block, or shell 40 is disposed adjacent to and covers substrate 20, along with lower portions of coupler elements 26 and 32, and their respective supports 28 and 34. This material can be formed from material such as, but not limited to, a layer of plastic or polymer material. If rigid supports are used, that is the coupler does not float, then material 40 can even comprise a portion or extension of housing 16. However, in the preferred embodiment of FIG. 1b, material 40 is shown resting within a raised housing extension 42. Material 40 is shown surrounding coupler elements 26 and 32 in FIG. 4.

Further, as best shown in FIGS. 2 and 3, coupler elements 26 and 32 together establish a channel 44 for closely receiving and supporting wireless telephone antenna 14. If desired, a thin plastic layer (not shown) can be positioned over elements 26 and 32 to assume the same contour as channel 44 and provides a level of physical protection for the elements. In any case, the skilled artisan will recognize that channel 44 is oriented in the direction of a longitudinal dimension or axis 46 that is defined by cradle 10 and telephone 12, when telephone 12 rests in cradle 10, to closely support antenna 14. This axis is roughly parallel to a longitudinal axis for antenna 14 (14a).

While coupler elements 26 and 32 accommodate at least one frequency of interest for telephone 12, another element is used in the present invention to accommodate a second frequency for telephone 12. That is, additional parasitic elements are used to provide a low loss coupling of signals at additional center frequencies to active feed element 26. This can be seen in FIG. 4 where a second parasitic element 52 is shown disposed adjacent to coupler elements 26 and 32.

Referring back to FIG. 1, in accordance with the present invention, housing 16 can include a raised side wall 50 next to coupler elements 26 and 32, with an elongated strip-like second parasitic element 52 positioned near a top surface 54. For clarity of disclosure, parasitic element 52 is shown resting on top surface 54, but it is to be understood that parasitic element 52 can be embedded in wall 50 slightly below the surface 54, or in other walls or portions of housing 16 adjacent to, the coupler elements. Where parasitic element 52 is positioned on top surface 54 of wall 50, it can be covered by a thin material such as a lacquer or plastic coating (not shown) to protect parasitic element 52 from physical abuse or damage, in addition to providing a more aesthetic appearance. Parasitic element 52 is manufactured from known conductive materials suitable for receiving signals, such as, but not limited to, brass, copper, or other metals or alloys, and metallic coated fibers or plastics.

In accordance with present principles, parasitic element 52 is oriented lengthwise in the direction defined by a longitudinal axis 58, and positioned as close as possible to feed coupler element 26. Parasitic element 52 is positioned to extend beyond both edges of active feed coupler 26 to provide reasonable coupling and loss characteristics. It is not necessary, but may be desirable for parasitic element 52 to be roughly longitudinally centered on feed element 26. With the above-described combination of structure, it will readily be appreciated that parasitic element 52 is disposed adjacent to feed coupler element 26 and accordingly is electromagnetically coupled thereto.

It is not necessary for parasitic element 52 to be perfectly flat, straight, or planar. This element can be bent, angled, or curved over all or a portion of its length to conform to desired shapes for purposes of use in cradle 10. This allows a parasitic element 52 of appropriate length to be used while achieving both proper support and protection for the element, and a desired aesthetic appearance for the cradle.

According to the present invention, the length "L" of parasitic element 52, and its longitudinal position relative to coupler elements 26 and 32, are established to optimize electromagnetic coupling between element 52 and active feed coupler element 26 for one of the two frequencies of operation for telephone 12. This means that L is typically on the order of one-half the wavelength for the frequency of interest. At the same time, the width "W" of the parasitic element is much less than one-half the wavelength. In one preferred embodiment, width W of element 52 is about one and one-half millimeters (1.5 mm). In addition, the thickness of element 52 is generally fairly thin, and is determined according to known techniques for manufacturing conductive elements. On the other hand, parasitic coupler element 32 is configured to be electromagnetically coupled to signals having the other frequency used by telephone 12.

Thus, for example, the trough-like first parasitic element 32 can be configured for coupling so-called "cellular" signals having a center frequency of about eight hundred fifty nine million cycles per second (859 MHz), while the strip-like parasitic element 52 has a length that is established for coupling so-called "personal communication system", or PCS, signals having a center frequency of about nineteen hundred twenty million cycles per second (1920 MHz). It is to be understood that the present arrangement can be expanded to any number of additional frequencies, using additional parasitic couplers and elements, to improve communication quality. This is shown by the additional element 52n in phantom outline in FIG. 4 which indicates that up to "n" additional elements could be employed, provided there is sufficient room and no undue interference.

Figure 5:
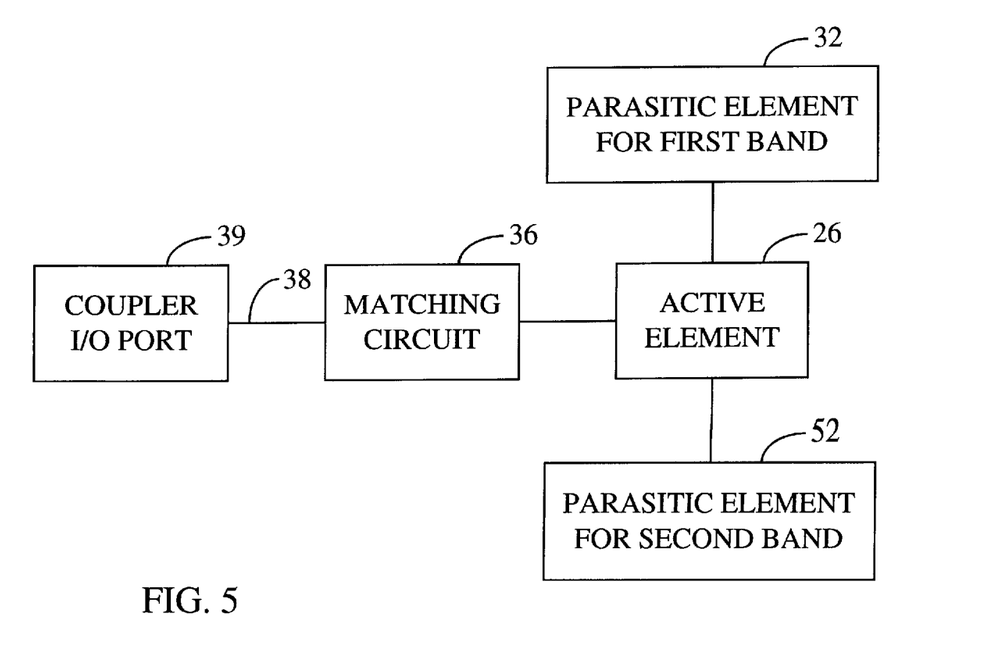
FIG. 5 is a block diagram of the equivalent circuit for the embodiment of the FIGS. 1, 2, and 4.

An overview of the equivalent circuit for the dual parasitic element configuration is illustrated in FIG. 5. In FIG. 5, the main element is a radiator/receptor connected to an I/O port 39 through cable 38 and a matching circuit 36. The two parasitic elements 32 and 52 couple energy at the appropriate frequencies to the active element 26. This structure is used to create good electromagnetic coupling between the parasitic elements and the active feed without requiring a common ground. The coupler and antenna are not in physical contact but in close proximity.

Figure 6:
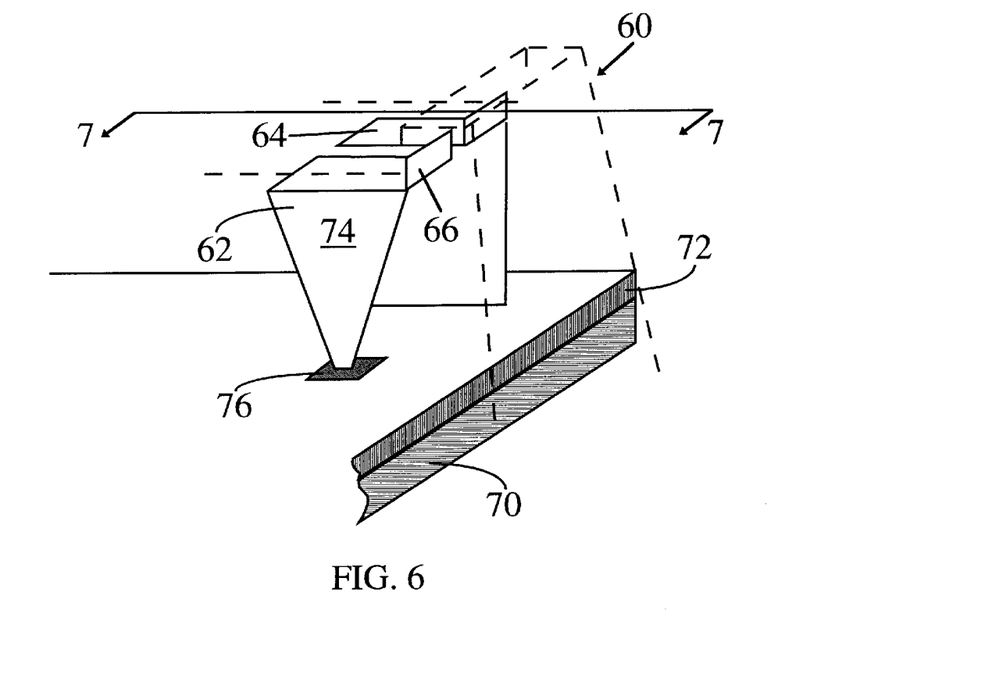
FIG. 6 is a perspective view of another alternate embodiment of the RF coupler, with portions of a plastic housing shown in phantom.
Figure 7A:
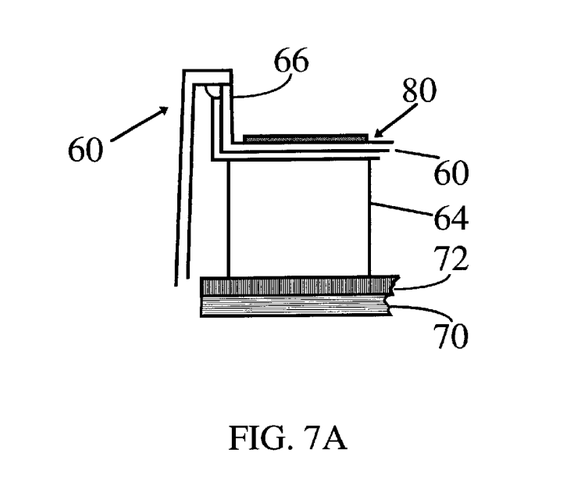
FIG. 7a is a cross-sectional view as would be seen along line 7—7 in FIG. 6.
Figure 7B:
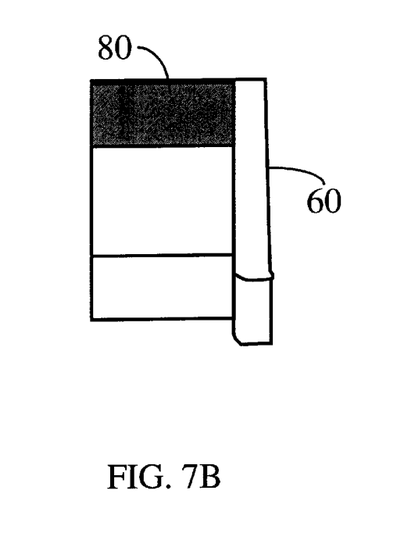
FIG. 7b is a top view of the RF coupler of FIG. 6 from outside the housing.

Referring now to FIGS. 6 and 7 (7a, 7b), an RF coupler for use in a wireless telephone cradle, or other location, substantially as shown above, includes a substantially flat-topped active feed coupler element 62 that is embedded in a housing 60. Feed element 62 may have a raised longitudinal edge 66 as shown, to provide additional width or structural integrity. A parasitic element 64 that is configured substantially the same as active feed element 62 is positioned next to feed element 62.

As seen in FIG. 6, both active feed 62 and parasitic coupler element 64 are supported by a substrate 70 which has a conductive layer 72 on the top surface to form a ground plane. However, either surface could be used to create a ground plane. Active feed 62 is shown having a support portion 74 which extends down through a passage 76 in substrate 70 to connect to appropriate matching circuits and I/O connections (not shown). Passage 76 provides sufficient clearance for support portion 74 to be electrically isolated from the ground plane where it passes through substrate 70. Alternatively, passage 76 has an insulating material disposed therein to prevent electrical contact. Parasitic coupler element 64 is electrically connected to the ground plane formed by layer 72, using known means as discussed earlier, while active feed 62 is not.

As can be best seen in FIGS. 7a and 7b, a metal patch-like parasitic element 80 is positioned above first parasitic element 64 with housing 60 sandwiched between elements 64 and 80. As in the case of parasitic element 52, patch element 80 can be covered by a thin layer of plastic, lacquer, or the like, to protect it from damage.

The patch-like parasitic element 80 operates to effectively reduce the distance between first parasitic element 64 and an antenna of a wireless telephone that is disposed on housing 60 with its antenna adjacent to the flat surfaces of coupler elements 62 and 64. This improves the electromagnetic coupling between the antenna and parasitic element 64 and, hence, decreases signal loss and improves communication quality.

It has been found that the above design functions very well with a performance approaching that of single band couplers. It works well with single as well as multi-band telephones. It is an inexpensive solution to a problem of coupling. Design is made simpler by the fact that the matching circuit can be designed for one frequency and the other is optimized by the design of the parasitic element. The parasitic elements provide improved signal matching and increase coupling efficiency.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim as our invention is:

1. A cradle for supporting a wireless device having an antenna, comprising:
   a non-conductive housing;
   a ground plane disposed in the housing;
   a feed coupler element electrically isolated from the ground plane;
   a first parasitic coupler element electrically connected to the ground plane juxtaposed with the feed coupler element for electromagnetically coupling signals to and from the antenna, the elements together establishing an antenna channel for receiving the antenna therein; and
   a second parasitic element electrically isolated from the ground plane disposed adjacent the feed coupler element for electromagnetically coupling signals to and from the antenna.

2. The cradle of claim 1, wherein the wireless device can communicate using first and second frequencies, and the first parasitic coupler element is configured for being electromagnetically coupled to signals having the first frequency.

3. The cradle of claim 2, wherein the second parasitic element is configured for being electromagnetically coupled to signals having the second frequency.

4. The cradle of claim 3, wherein the second parasitic element is an elongated strip of metal.

5. The cradle of claim 4, wherein the housing defines a longitudinal dimension, and the second parasitic element is oriented longitudinally on the housing.

6. The cradle of claim 5, wherein the coupler elements are configured as half-cylinders.

7. The cradle of claim 1, wherein the ground plane is established by a first conductive board and a second conductive board, the second conductive board being elevated above the first conductive board and oriented substantially parallel thereto, the boards being in electrical communication, the feed coupler element being mounted on the second conductive board.

8. A cradle for supporting a wireless device having an antenna, comprising:
   a housing;
   a ground plane disposed in the housing;
   a feed coupler element electrically isolated from the ground plane;
   a first parasitic coupler element electrically connected to the ground plane juxtaposed with the feed coupler element for electromagnetically coupling signals to and from the antenna, the elements together establishing an antenna channel for receiving the antenna therein, wherein the coupler elements are embedded in the housing;
   a second parasitic element disposed adjacent the feed coupler element for electromagnetically coupling signals to and from the antenna; and
   a parasitic patch element positioned on the housing above the parasitic coupler element.

9. The cradle of claim 1, in combination with a wireless telephone.

10. A device for holding a wireless telephone in a vehicle, the wireless telephone including an antenna, the device comprising:
    a plastic housing;
    a first conductive board;
    a second conductive board elevated above the first conductive board and oriented parallel thereto, the boards being in electrical communication and establishing a ground plane;
    a feed coupler element electrically connected to at least one matching circuit on the second conductive board; and a parasitic coupler element connected to the ground plane on the second conductive board juxtaposed with the feed coupler element for electromagnetically coupling signals to and from the antenna, the elements together establishing an antenna channel for receiving the antenna therein, wherein the coupler elements are embedded within the housing;

a second parasitic element disposed adjacent the feed coupler element for electromagnetically coupling the second parasitic element to signals in the feed coupler antenna; and a parasitic patch element positioned on the housing above the parasitic coupler element.

11. The device of claim 10, wherein the feed and parasitic coupler elements have much larger width dimensions than the gap between them.

12. The device of claim 10, wherein the telephone can communicate using first and second frequencies, the first parasitic coupler element is configured for being electromagnetically coupled to signals having the first frequency, and the second parasitic element is configured for being electromagnetically coupled to signals having the second frequency.

13. The device of claim 12, wherein the second parasitic element is an elongated strip of metal oriented longitudinally relative to the housing.

14. The device of claim 13, wherein the coupler elements are configured as half-cylinders.

15. The device of claim 10, in combination with the telephone.

16. The device of claim 10, wherein the conductive boards are connected together by rigid posts.

17. The device of claim 10, wherein the conductive boards are connected together by springs.

18. A method for coupling signals between a mobile telephone antenna and a telephone cradle in a vehicle when the telephone is disposed in the cradle to facilitate hands free communication, comprising the steps of:

providing a feed coupler element electrically isolated from a ground plane for holding the antenna;

electrically connecting the feed coupler element to at least one matching circuit;

juxtaposing a first parasitic coupler element with the feed coupler element to hold the antenna and to electromagnetically couple signals having a first frequency to the feed coupler element, and connecting it to the ground plane; and juxtaposing a second parasitic element, which is electrically isolated from the ground plane, with the feed coupler element to electromagnetically couple signals having a second frequency to the feed coupler element.

19. The method of claim 18, further comprising the step of:

providing a first conductive board and a second conductive board elevated above the first conductive board and oriented substantially parallel thereto, the boards being in electrical communication to establish the ground plane.

20. A cradle for supporting a wireless device having an antenna, comprising:

a housing;

a ground plane disposed in the housing;

a feed coupler element;

a first parasitic coupler element electrically connected to the ground plane juxtaposed with the feed coupler element for electromagnetically coupling signals between itself and the antenna, the elements together establishing an antenna channel for receiving the antenna therein; and a second parasitic element disposed adjacent the first parasitic element for electromagnetically coupling signals to and from the antenna;

wherein the second parasitic element comprises a patch of conductive material juxtaposed between the first parasitic coupler element and an antenna for the wireless device.

* * * * *